United States Patent
Huomo et al.

(10) Patent No.: US 8,730,906 B2
(45) Date of Patent: May 20, 2014

(54) APPARATUS AND METHOD FOR REMOVING PATH MANAGEMENT

(75) Inventors: Miikka Huomo, Espoo (FI); Tom Grahn, Vantaa (FI)

(73) Assignee: Core Wireless Licensing S.a.r.l., Luxembourg (LU)

(*) Notice: Subject to any disclaimer, the term of this patent is extended or adjusted under 35 U.S.C. 154(b) by 137 days.

(21) Appl. No.: 12/003,928

(22) Filed: Jan. 3, 2008

(65) Prior Publication Data

US 2008/0165725 A1 Jul. 10, 2008

Related U.S. Application Data

(60) Provisional application No. 60/879,044, filed on Jan. 8, 2007.

(51) Int. Cl.
  *H04W 4/00* (2009.01)
  *H04B 7/212* (2006.01)
  *H04J 3/00* (2006.01)
  *H04W 36/00* (2009.01)
  *H04W 68/00* (2009.01)

(52) U.S. Cl.
  USPC ........... 370/331; 370/335; 370/336; 370/342; 370/345; 456/436; 456/458

(58) Field of Classification Search
  USPC .......... 370/328–336, 338–346; 455/436–444, 455/458
  See application file for complete search history.

(56) References Cited

U.S. PATENT DOCUMENTS

| | | | | |
|---|---|---|---|---|
| 7,079,519 | B2 * | 7/2006 | Lee et al. | 370/338 |
| 7,636,573 | B2 * | 12/2009 | Walton et al. | 455/454 |
| 2003/0119489 | A1 * | 6/2003 | Mohammed | 455/414 |
| 2005/0181805 | A1 * | 8/2005 | Gallagher | 455/456.1 |
| 2005/0201371 | A1 * | 9/2005 | Lauer | 370/389 |
| 2005/0271008 | A1 * | 12/2005 | Gallagher et al. | 370/329 |
| 2006/0050667 | A1 * | 3/2006 | Verma et al. | 370/338 |
| 2006/0262778 | A1 * | 11/2006 | Haumont et al. | 370/356 |
| 2007/0041360 | A1 * | 2/2007 | Gallagher et al. | 370/352 |
| 2008/0130637 | A1 * | 6/2008 | Kant et al. | 370/389 |

FOREIGN PATENT DOCUMENTS

EP  1 580 942 A2  9/2005
EP  1 580 942 A3  9/2005

OTHER PUBLICATIONS

International Search Report, PCT/IB2007/003991 dated Jul. 2, 2008.
3GPP TS 29.060 v7.4.0; "3rd Generation Partnership Project; Technical Specification Group Core Network and Terminals; General Packet Radio Service (GPRS); GPRS Tunnelling Protocol (GTP) Across the Gn and Gp Interface (Release 7)"; pp. 1-141; Dec. 2006.

(Continued)

*Primary Examiner* — Un C Cho
*Assistant Examiner* — Jeremy Costin
(74) *Attorney, Agent, or Firm* — Ziegler IP Law Group, LLC

(57) ABSTRACT

An apparatus and method are provided to identify an endpoint as a general packet radio service tunneling protocol endpoint, and configure a radio access bearer to skip a path management procedure. The apparatus and method also transmit the radio access bearer to a universal generic access network controller to prevent activation of the path management procedure to the general packet radio service tunneling protocol endpoint.

33 Claims, 5 Drawing Sheets

(56) References Cited

OTHER PUBLICATIONS

3GPP TS 23.060 V7.3.0 (Dec. 2006), 3rd Generation Partnership Project, Technical Specification Group Services and System Aspects; General Packet Radio Services (GPRS); Service Description; Stage 2 (Release 7) pp. 1-214.

3GPP TS 25.413 V7.4.0 (Dec. 2006), 3rd Generation Partnership Project; Technical Specification Group Radio Access Network; UTRAN lu interface RANAP signaling (Release 7), pp. 1-342.

* cited by examiner

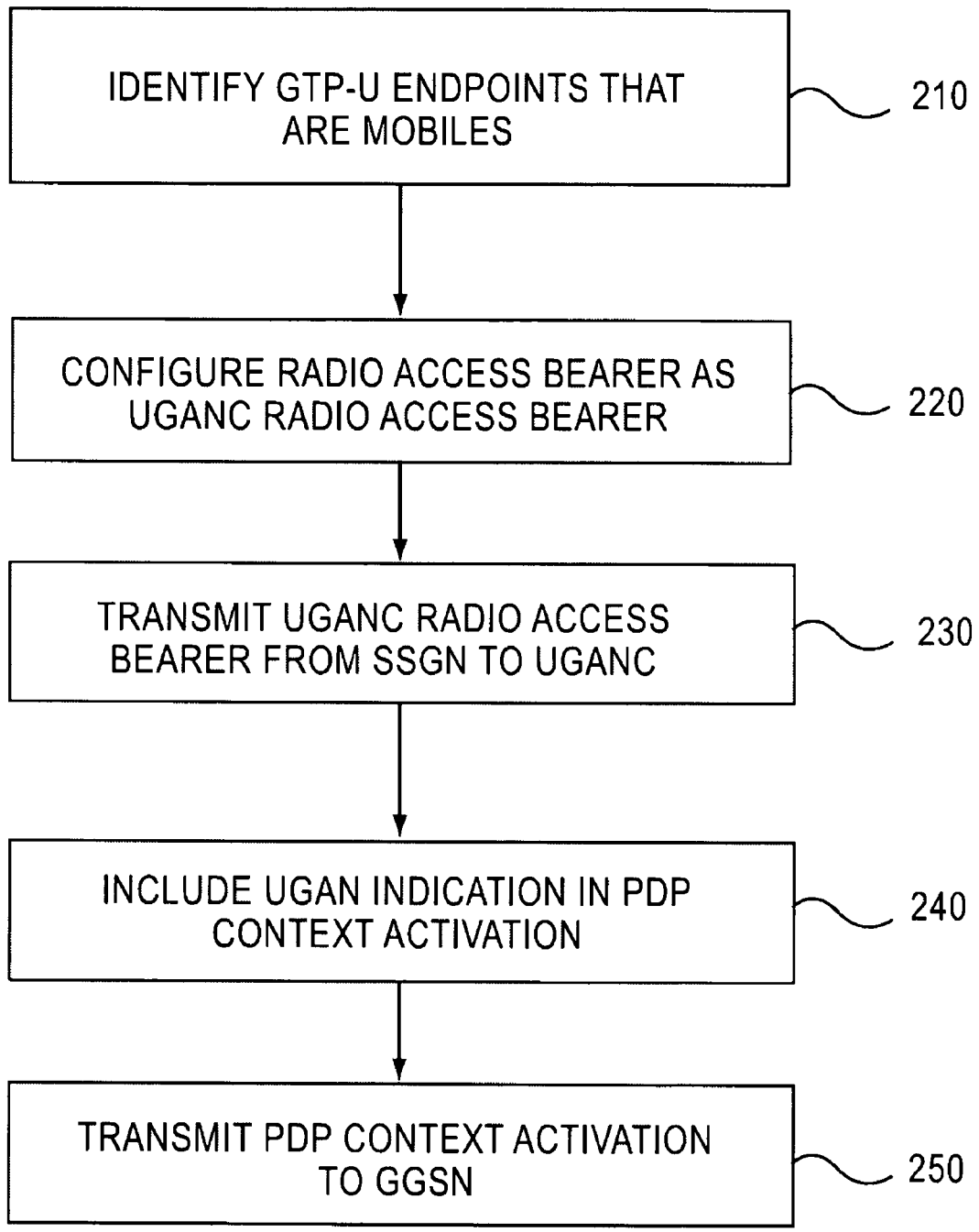

APPARATUS AND METHOD FOR REMOVING PATH MANAGEMENT

BACKGROUND OF THE INVENTION

1. Field of the Invention

The present invention defines a mechanism which would not activate path management for a mobile device in which a general packet radio service tunneling protocol-user plane (GTP-U) protocol would be implemented.

2. Description of the Related Art

Unlicensed Mobile Access (UMA) is an extension of Global System for mobile communication (GSM)/general packet radio service (GPRS) mobile services into the customer's premises that is achieved by tunneling certain GSM/GPRS protocols between the customer's premises and a core network (CN) over a broadband IP network. Unlicensed Mobile Access (UMA) is a complement to traditional GSM/GPRS radio coverage, used to enhance customer premises coverage, increase network capacity and potentially lower costs. UMA consortium originally developed specifications, but in late 2005 $3^{rd}$ Generation Partnership Project (3GPP) adopted the UMA specifications and produced generic access network (GAN) specifications.

Currently, 3GPP parties are discussing alternatives to evolve GAN even more and one strong alternative is universal mobile telecommunication system (UMTS) GAN, i.e., UMTS CS/PS access over wireless local area network (WLAN) (similar to traditional UMA). A system and method are needed that would include a mechanism to allow optimization of packet data throughput in a universal mobile telecommunications system generic access network.

SUMMARY OF THE INVENTION

In accordance with an embodiment of the present invention, there is provided an apparatus, including an identifier configured to identify an endpoint as a general packet radio service tunneling protocol endpoint, and a processor configured to control a radio access bearer to skip a path management procedure. The apparatus also includes a transmitter configured to transmit the radio access bearer to a universal generic access network controller to prevent activation of the path management procedure to the general packet radio service tunneling protocol endpoint.

In accordance with an additional embodiment of the present invention, there is provided an apparatus, including a processor configured to skip path management when a generic routing encapsulation protocol is included in a general packet radio service tunneling protocol endpoint and configured to deactivate echo request/response and version unsupported messages for the general packet radio service tunneling protocol endpoint.

In accordance with another embodiment of the present invention, there is provided an apparatus, including identifier means for identifying an endpoint as a general packet radio service tunneling protocol endpoint, and processing means for controlling a radio access bearer to skip a path management procedure. The apparatus also includes transmitting means for transmitting the radio access bearer to a universal generic access network controller to prevent activation of the path management procedure to the general packet radio service tunneling protocol endpoint.

In accordance with an embodiment of the present invention, there is provided a system, including an endpoint, a universal generic access network controller, and a serving node configured to identify the endpoint as a general packet radio service tunneling protocol endpoint. The serving node is also configured to control a radio access bearer to skip a path management procedure, and configured to transmit the radio access bearer to the universal generic access network controller to prevent activation of the path management procedure to the general packet radio service tunneling protocol endpoint.

In accordance with another embodiment of the present invention, there is provided a method and a computer program embodied on a computer readable medium, the computer program being configured to control a processor to perform identifying an endpoint as a general packet radio service tunneling protocol endpoint, and configuring a radio access bearer to skip a path management procedure. The method and the computer program also include transmitting the radio access bearer to a universal generic access network controller to prevent activation of the path management procedure to the general packet radio service tunneling protocol endpoint.

In accordance with an additional embodiment of the present invention, there is provided a method and a computer program embodied on a computer readable medium, the computer program being configured to control a processor to perform skipping path management when a generic routing encapsulation protocol is included in a general packet radio service tunneling protocol endpoint, and deactivating echo request/response and version unsupported messages for the general packet radio service tunneling protocol endpoint.

BRIEF DESCRIPTION OF THE DRAWINGS

Further embodiments, details, advantages and modifications of the present invention will become apparent from the following detailed description of the preferred embodiments which is to be taken in conjunction with the accompanying drawings, in which:

FIG. 5 illustrates a method illustrating a process that would not activate a general packet radio service tunneling protocol (GTP-U) path management in UGAN, in accordance with an embodiment of the present invention.

DETAILED DESCRIPTION OF THE PREFERRED EMBODIMENTS

Figure 1:
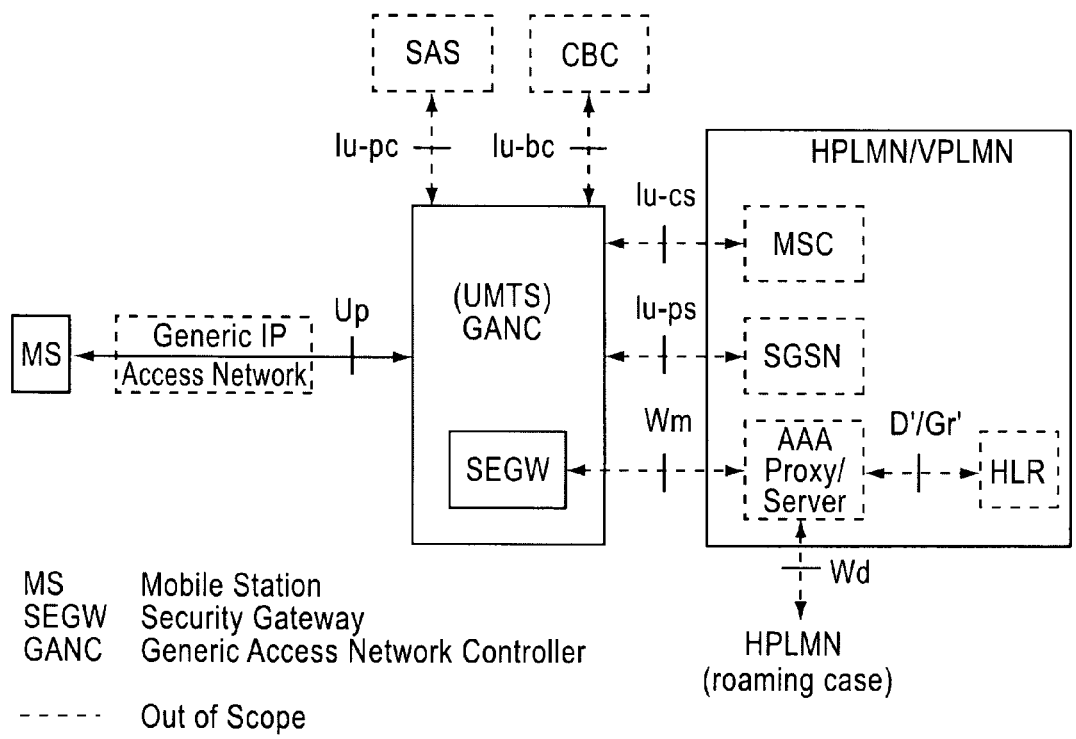
FIG. 1 illustrates a universal mobile telecommunication system generic access network (UGAN) functional architecture, in accordance with an embodiment of the present invention.

Reference will now be made in detail to preferred embodiments of the present invention, examples of which are illustrated in the accompanying drawings. A general packet radio service tunneling protocol (GTP-U) is a general packet radio service (GPRS) tunneling protocol in which user plane messages are exchanged between GSN (gateway support node) pairs, generic access network controller (GANC), or GSN/RNC (radio network controller) pairs in a path. The user plane messages are used to carry user data packets, and signaling messages for path management and error indication.

A generic access network (GAN) is an evolving wireless communications system in which mobile phone sets function seamlessly between local area networks (LANs) and wide-area networks (WANs). Using GAN technology, a cell phone subscriber can communicate by voice, data and multimedia through large-scale cellular and small-scale Wi-Fi systems. Ideally, all handoffs between systems occur without interrupting the communications session.

As GAN technology is implemented, cellular telephone subscribers can expect improved coverage, the ability to use a single phone set for all their voice communications and perhaps cheaper rates with a single bill for Internet and voice communications. However, phone set technology for GAN use involves two different modes, both of which must be constantly accessible. This requires that every phone set have two transceivers active at all times, one for conventional cellular service and the other for Wi-Fi. This places an increased current demand on the battery.

Universal mobile telecommunications system generic access network (UGAN) is an extension of UMTS mobile services that is achieved by tunneling Non access stratum (NAS) protocols between the user equipment or a mobile station, an apparatus, or a device (MS) and a core network (CN) over an internet protocol (IP) network. UGAN is a complement to traditional global system for mobile communication (GSM)/GPRS/universal mobile telecommunication system (UMTS) radio access network coverage.

Accordingly, the embodiments of the present invention described below provide a system and method in instances that the GTP-U endpoint is included in a mobile station (MS), a serving GPRS support node (SGSN)/gateway GPRS support node (GGSN) would not activate path management, including echo request/response and version not supported messages, for such mobile station. This may allow not overload a network, thereby reducing signaling and saving device battery. In addition, the system and method allows SGSN/GGSN to identify the GTP-U endpoints, which are mobiles.

Although FIGS. 1-5 are described below implementing the universal mobile telecommunications system generic access network (UGAN), a person of ordinary skill in the art will appreciate that other types of networks may be implemented so that the system and method of the present invention are able to identify MSs including the GTP-U endpoint so that the path management is not activated. In addition, although the present embodiments are implemented to identify MSs including the GTP-U endpoint so that the path management is not activated, person of ordinary skill in the art will appreciate that GTP-U could be replaced by generic routing encapsulation (GRE) or other tunneling protocol. Furthermore, a GRE tunnel can exist between the MS and GGSN or between the MS and enhanced generic access network controller (EGANC) (Up interface) and EGANC to GGSN (Gn interface). For IPSec (between the mobile and EGANC, up interface) and GPRS authentication, ciphering and possible data and header compressions could be negotiated and disabled for user data and/or and signaling when the MS is registered in an enhanced generic access network (EGAN). This solution optimizes EGAN performance. If EGANC and SGSN are integrated to one single element the negotiation can be done during EGANC registration or also later on in the GPRS LLC/SNDCP and L3 layers.

FIG. 1 illustrates a universal mobile telecommunication system generic access network (UGAN) functional architecture, in accordance with an embodiment of the present invention. The main features of the UGAN architecture with enhanced functionalities are the MS and a generic IP access network. The functionality of the MS is modified to support Iu Interface Generic Access ("Iu mode GAN") operation. The MS may support Iu mode GAN operation, A/Gb mode GAN operation, or both. Mode selection may be performed during registration. A functionality of a universal mobile telecommunications system generic access network controller (UGANC) is expanded so as to appear to the core network as a UTRAN radio network controller (RNC). The UGANC includes a security gateway (SEGW) that terminates secure remote access tunnels from the MS, providing mutual authentication, encryption and data integrity for signaling, voice and data traffic.

A generic IP access network provides connectivity between the MS and the UGANC. The IP transport connection extends from the UGANC to the MS. A single interface, the Up interface, is defined between the UGANC and the MS. Functionality is added to this interface to support the Iu-mode GAN service.

Transaction control (e.g. CC (call control), SM (session management)) and user services may be provided by a core network (e.g., MSC/VLR (Mobile Switching Center/Visited Location register) and the SGSN/GGSN).

Figure 2:
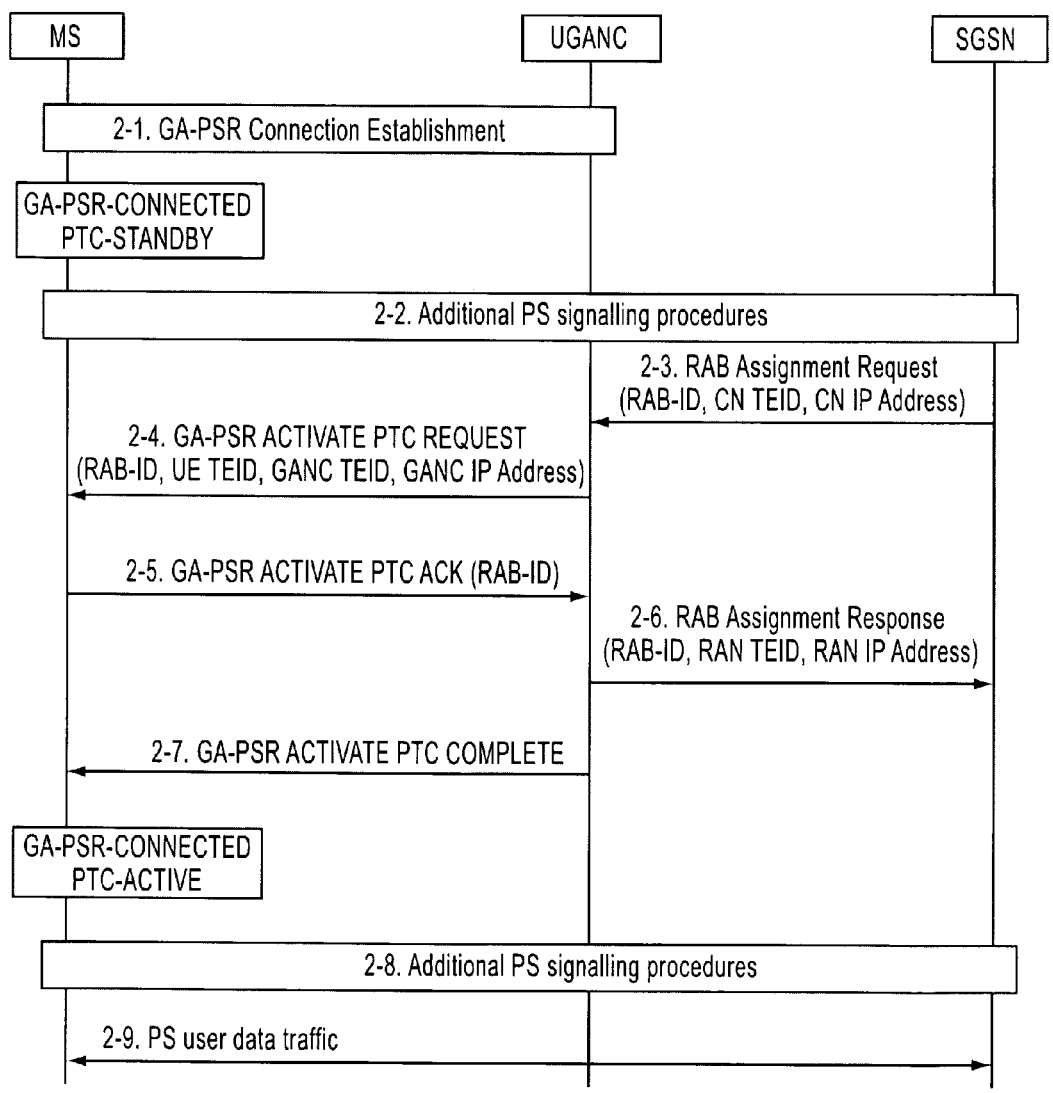
FIG. 2 illustrates a packet transport channel initial activation procedure, in accordance with an embodiment of the present invention.

FIG. 2 illustrates a packet transport channel initial activation procedure, assuming that the MS is in a generic access packet switched idle (GA-PSR-IDLE) state, in accordance with an embodiment of the present invention. FIG. 2 illustrates how necessary parameters for packet switch user plane are exchanged. At step 2-1, a generic access packet switched resources (GA-PSR) connection establishment procedure is performed. The MS transitions to the GA-PSR-CONNECTED state and a packet timing control standby (PTC-STANDBY) substate. At step 2-2, additional packet switched (PS) signaling procedures are performed.

At step 2-3, the SGSN initiates a radio access bearer (RAB) assignment procedure and includes a radio access bearer identifier (RAB-ID), the core network transport layer address (IP address) and the core network Iu transport association (GTP-U terminal endpoint identifier, TEID) for user data.

At step 2-4, the UGANC sends a GA-PSR ACTIVATE PTC REQUEST message to the MS to request activation of the packet transport channel. The message includes the RAB-ID, a tunnel endpoint identifier (TEID) that the GANC assigns to the MS, and the GANC IP Address and GANC TEID. To allow the MS to send PTC packets (i.e., GTP-U messages) directly to the SGSN, the UGANC sets the UGANC IP address to a core network (CN) IP address and the UGANC TEID to the CN TEID.

At step 2-5, the MS acknowledges a packet timing control (PTC) activation. At step 2-6, the UGANC sends a RAB assignment response message to the SGSN to complete a RAB assignment procedure. To allow the SGSN to send GTP-U messages directly to the MS, the UGANC sets the RAN IP address to the MS's IP address and the RAN TEID to the TEID assigned to the MS by the UGANC. At step 2-7, the UGANC signals the completion of the RAB establishment to the MS with the GA-PSR ACTIVATE PTC COMPLETE message. On receipt of the message, the MS transitions to the PTC-ACTIVE sub-state and starts the PTC timer. At step 2-8, additional packet switched (PS) signaling procedures are performed, and at step 2-9, the MS initiates uplink user data transfer via the established PTC and the SGSN may use the same transport channel to send downlink user data packets.

However, in accordance with an embodiment of the present invention, SGSN/GGSN would not activate a path management for these GTP-U endpoints as the number of endpoints may be high. Thereby, if a packet data protocol (PDP) context is not active the mobile station would not answer to GTP echo which would cause GGSN/SGSN to deactivate the PDP context. Accordingly, in order to avoid or skip activating the path management for the GTP-U endpoints, the SGSN would identify the UGANC. Then, all of the RAB assignments sent to UGANC would provide the MS address (GTP-U endpoint) as a response. According to an aspect of the present invention, such process would allow easy identification of the GTP-U endpoints. In an alternative embodiment of the present invention, other options to identify the GTP-U endpoints may include configuring IP endpoints or ranges as general packet radio service tunneling protocol endpoints. Alternatively, the GTP-U path management could be disabled from all GTP endpoints. Thus, the SGSN would identify the GTP-U endpoints through the UGANC to ultimately not activate path management for these GTP-U endpoints.

Therefore, in accordance with an embodiment of the present invention, the SGSN may include several alternatives to identify UGANC. For instance, the SGSN may be configured during operations and maintenance. Specifically, while the RNC may be added to the SGSN configuration, UGANC could identify itself to the SGSN in IU reset phase, or UGANC could identify itself to the SGSN by sending a new message or utilizing an existing message for this purpose. Alternatively, the MS could include its access type in GPRS attach and a radio area update (RAU) or the SGSN could determine the access based on, for instance, RNC-ID or routing area identification (RAI)/location area identity (LAI).

After the SGSN has identified UGANC, the SGSN would configure (At step 3 of FIG. 2) the RABs as UGANC RABs so that the SGSN is able to skip GTP-U path management procedures. RABs can be established as specified in 3GPP standards to the UGANC (3GPP TS 25.413 V7.4.0 (2006-12), $3^{rd}$ Generation Partnership Project, Technical Specification Group Radio Access Network; UTRAN Iu interface RANAP signaling (Release 7), see for example paragraph 8.2 RAB Assignment, and 3GPP TS 23.060 V7.3.0 (2006-12), $3^{rd}$ Generation Partnership Project, Technical Specification Group Services and System Aspects; General Packet Radio Service (GPRS); Service Description; Stage 2 (Release 7), see for example paragraph 6). In accordance with an embodiment of the invention, the UGANC may transmit an acknowledgement back to the SGSN indicative that the GTP path management is not to be activated.

Figure 3:
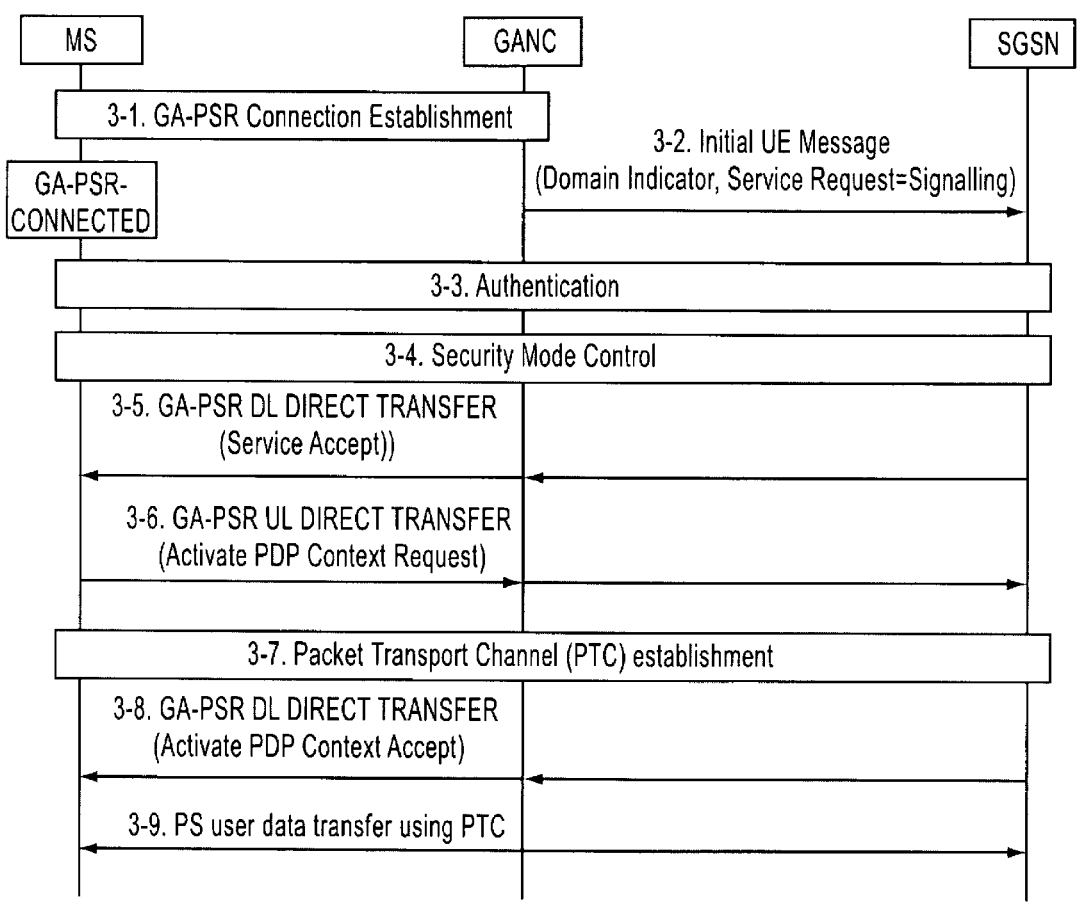
FIG. 3 illustrates a mobile station initiated packet data protocol context activation procedure, in accordance with an embodiment of the present invention.

FIG. 3 illustrates an MS-initiated PDP context activation procedure, assuming the MS is in a generic access-packet switched resource idle (GA-PSR-IDLE) state. At step 3-1, a GA-PSR connection establishment procedure is performed. At step 3-2, the GANC establishes an SCCP connection to the SGSN and forwards the Service Request message (with service type value "signaling") to the SGSN using the RANAP initial UE message. Subsequent NAS messages between the MS and core network may be sent between GANC and SGSN using the RANAP direct transfer message. At step 3-3, the SGSN may optionally authenticate the MS using standard UTRAN authentication procedures. At step 3-4, the SGSN may optionally initiate the security mode control procedure. At step 3-5, the SGSN responds with a service accept message. The GANC forwards the message to the MS. At step 3-6, the MS sends the activate PDP context request message providing details on the PDP context to the SGSN. This message is contained within the GA-PSR UL DIRECT TRANSFER between the MS and the GANC. The GANC forwards the Activate PDP context request message to the SGSN. PDP context activation or downlink data may trigger SGSN to establish RAB as defined in the document earlier.

At step 3-7, the MS, GANC and SGSN establish the GA-PSR packet transport Channel (PTC). At step 3-8, the SGSN indicates the PDP context establishment is complete using the activate PDP context accept message to the GANC. GANC forwards the activate PDP context accept message to the MS in the GA-PSR DL DIRECT TRANSFER message. At step 3-9, the MS and CN exchange user data transfer via the established PTC.

The MS may find the UGANC in the discovery and registration phase so that MS requests UGANCs in the discovery phase. This means that discovery and possibly default GANC may need to support new parameters. The MS is redirected to UGANC capable GANC if it requested so in a generic access-radio controller (GA-RC) discovery request/accept.

In accordance with an embodiment of the present invention, the SGSN needs to mark UGANC PDP contexts to be able to notify GGSN as it should also skip GTP path management. To do so, the SGSN may include an UGAN indication to PDP context activation (similarly as, for instance, in direct tunnel). From the indication GGSN knows that GTP-U path management for the peer endpoints should not be enabled. SGSN could also send indication in PDP context update, in case the MS has re-located under UGAN or the UGAN access information is not available in the PDP context activation phase. In accordance with an alternative embodiment of the present invention, the SGSN could disable GTP-U path management completely. In accordance with another embodiment of the present invention, the SGSN could selectively configure specific MSs (GTP-U endpoints) where path management is necessary.

To save radio resources and terminal battery another alternative of the present invention may include hiding the GTP-U endpoint behind the UGANC so that it could answer echo requests sent by the core network (CN). The UGANC could simply respond with same sequence number and reset counter and it does not even need to pretend to be the mobile. Mobiles may not need to send echo at all as they will be informed immediate by error indication if network is down.

Figure 4:
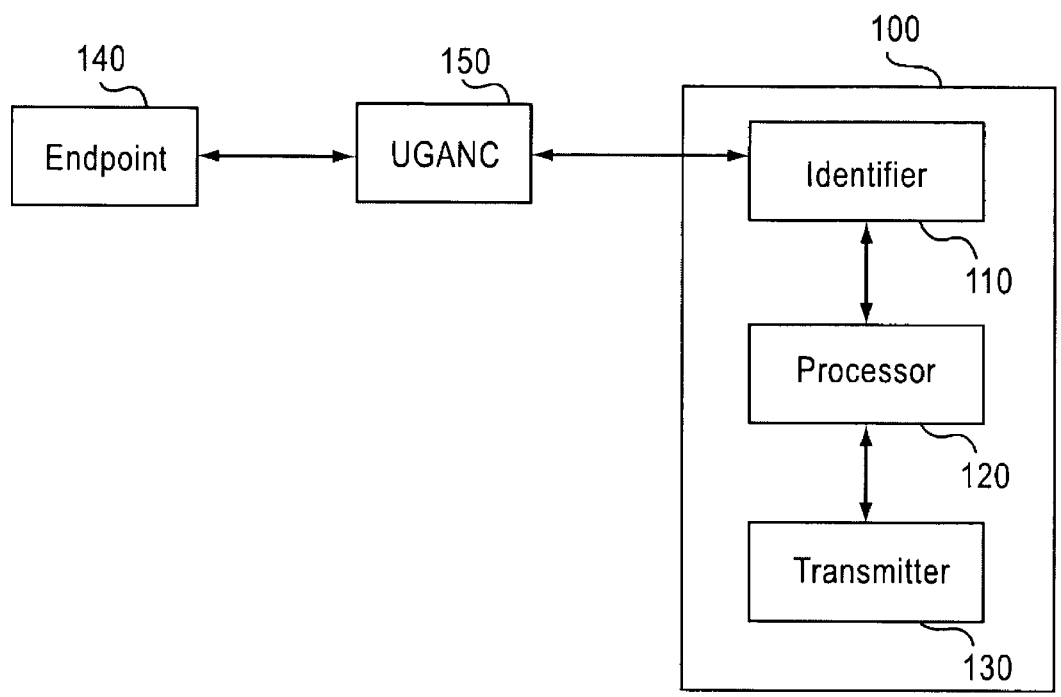
FIG. 4 illustrates an apparatus or a serving general packet radio service support node, in accordance with an embodiment of the present invention.

FIG. 4 illustrates an apparatus or a serving general packet radio service support node 100, in accordance with an embodiment of the present invention. The service support node 100 includes an identifier 110 configured to identify a mobile station (MS) as a general packet radio service tunneling protocol endpoint 140. A processor 120 in the service support node 100 is configured to control a radio access bearer to skip a path management procedure. The service support node 100 also includes a transmitter 130 configured to transmit the radio access bearer to a universal generic access network controller 150 to prevent activation of the path management procedure to the general packet radio service tunneling protocol endpoint 140.

The identifier 110 is also configured to identify the general packet radio service tunneling protocol endpoint 140 through the universal generic access network controller 150 to prevent activation of the path management procedure for the general packet radio service tunneling protocol endpoint 140. The path management procedure may include a general packet radio service tunneling protocol path management.

The identifier 110 is configured to identify the universal generic access network controller 150 when a radio network controller is added. The universal generic access network controller 150 may identify itself in a reset phase or by sending a new message or utilizing an existing message. The identifier 110 is configured to identify the general packet radio service tunneling protocol endpoint 140 based on a radio network controller identifier 110 or routing area identification/location area identity. In accordance with an embodiment of the present invention, the identifier 110 may be configured to identify internet protocol endpoints or ranges as general packet radio service tunneling protocol endpoints.

The MS or the general packet radio service tunneling protocol endpoint 140 may include an associated access type in a general packet radio service attach and a radio area update.

The processor 120 is further configured to set an internet protocol address of the universal generic access network controller 150 to an internet protocol address of a core network, and set a tunnel endpoint identifier of the universal generic access network controller 150 to a tunnel endpoint identifier assigned to the core network to receive general packet radio service tunneling protocol messages directly from the endpoint.

In the alternative, the processor 120 may be configured to set an internet protocol address of a radio access network to an internet protocol address of the endpoint using a universal generic access network controller 150, and set a tunnel endpoint identifier of the radio access network to a tunnel endpoint identifier assigned to the endpoint by the universal generic access network controller 150 to send general packet radio service tunneling protocol messages directly to the endpoint.

After the identifier 110 identifies the endpoint as a general packet radio service tunneling protocol endpoint 140, the processor 120 is configured to define a radio access bearer as a universal generic access network controller 150 radio access bearer to skip the path management procedure. The transmitter 130 is further configured to transmit radio access bearer assignments to the universal generic access network controller 150 providing the general packet radio service tunneling endpoint.

The transmitter 130 is further configured to transmit a universal generic access network indication to a packet data protocol context activation to notify a gateway support node that path management is to be skipped. Furthermore, the transmitter 130 transmits an updated universal generic access network indication to a packet data protocol context activation to notify a gateway support node that path management is to be skipped when the general packet radio service tunneling protocol endpoint 140 has re-located under a universal generic access network or the universal generic access network access information is unavailable in the packet data protocol context activation phase.

FIG. 5 illustrates a method illustrating a process that would not activate GTP-U path management in UGAN, in accordance with an embodiment of the present invention. At step 210, the method identifies GTP-U endpoints that are mobiles. At step 220, the method configures the RABs as UGANC RABs. At step 230, the SGSN transmits the RABs to the UGANC so that GTP path management is not activated for the MS with the GTP-U endpoint for packet switched (PS) data. At step 240, the SGSN would include the UGAN indication to the PDP context activation. At step 250, the SGSN transmits the PDP context activation to the GGSN so that it knows that GTP-U path management for the mobiles with GTP-U endpoint should not be enabled.

It is to be understood that in the embodiment of the present invention, the steps may be performed in the sequence and manner as shown although the order of some steps and the like may be changed without departing from the spirit and scope of the present invention.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Various user equipment such as computers (fixed or portable), mobile telephones, and personal data assistants or organizers are known to those skilled in the art which may be used to access the Internet to obtain services. Mobile stations are one example of user equipment that may communicate via a wireless interface with another device, such as a base station of a mobile telecommunication network or any other station.

The term "service" used above and hereinafter will be understood to broadly cover any service, which a subscriber may desire, require or be provided with. The term also may be understood to cover the provision of complimentary services. In particular, but not exclusively, the term "service" may be understood to include Internet Protocol multimedia IM services, conferencing, telephony, gaming, rich call, presence, e-commerce, and messaging.

With respect to the present invention, a mobile station may be any device or apparatus that utilizes network data, and can include switches, routers, bridges, gateways or servers. In addition, while the term data has been used in the description of the present invention, the invention has import to many types of network data. For purposes of this invention, the term data includes packet, cell, frame, datagram, bridge protocol data unit packet, packet data and any equivalents thereof.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and step illustrated and described, and accordingly all suitable modifications and equivalents may be resorted to, falling within the scope of the invention.

The invention claimed is:

1. An apparatus comprising at least one processor and at least one memory including a computer program, the at least one memory and the computer program configured to, with the at least one processor, direct the apparatus at least to:
 identify a mobile station (MS) as a general packet radio service (GPRS) tunneling protocol endpoint;
 cause transmission of a radio access bearer to a universal generic access network controller to prevent activation of a path management procedure to the MS general packet radio service tunneling protocol endpoint; and
 cause transmission of a packet data protocol (PDP) context activation to a gateway GPRS support node (GGSN), the PDP context activation including a universal generic access network indication to notify the GGSN to prevent activation of the path management procedure to the MS general packet radio service tunneling protocol endpoint, wherein the activation of the path management procedure is prevented for an entire PDP context activation session;
 wherein the path management procedure comprises one of echo request messages, echo response messages, and version not supported messages.

2. The apparatus as recited in claim 1, wherein the apparatus is directed to identify the general packet radio service tunneling protocol endpoint through the universal generic access network controller to prevent activation of the path management procedure for the general packet radio service tunneling protocol endpoint.

3. The apparatus as recited in claim 1, wherein the apparatus is further directed to cause transmission of radio access bearer assignments to the universal generic access network controller providing the general packet radio service tunneling endpoint.

4. The apparatus as recited in claim 3, wherein the apparatus is directed to identify the universal generic access network controller when a radio network controller is added.

5. The apparatus as recited in claim 3, wherein the universal generic access network controller identifies itself in a reset phase or by sending a new message or utilizing an existing message.

6. The apparatus as recited in claim 1, wherein the apparatus is directed to identify the general packet radio service tunneling protocol endpoint based on a radio network controller identifier or routing area identification/location area identity.

7. The apparatus as recited in claim 1, wherein the apparatus is directed to identify internet protocol endpoints or ranges as general packet radio service tunneling protocol endpoints.

8. The apparatus as recited in claim 1, wherein the path management procedure comprises a general packet radio service tunneling protocol path management.

9. The apparatus as recited in claim 1, wherein the apparatus is further directed to set an internet protocol address of the universal generic access network controller to an internet protocol address of a core network, and set a tunnel endpoint identifier of the universal generic access network controller to a tunnel endpoint identifier assigned to the core network to receive general packet radio service tunneling protocol messages directly from the MS general packet radio service tunneling protocol endpoint.

10. The apparatus as recited in claim 1, wherein the apparatus is further directed to set an internet protocol address of a radio access network to an internet protocol address of the endpoint using a universal generic access network controller, and set a tunnel endpoint identifier of the radio access network to a tunnel endpoint identifier assigned to the endpoint by the universal generic access network controller to send general packet radio service tunneling protocol messages directly to the MS general packet radio service tunneling protocol endpoint.

11. The apparatus as recited in claim 1, wherein, after identifying the endpoint as a general packet radio service tunneling protocol endpoint, the apparatus is directed to define a radio access bearer as a universal generic access network controller radio access bearer to skip the path management procedure at least for the entire PDP context activation session.

12. The apparatus as recited in claim 1, wherein the apparatus is further directed to cause transmission of an updated universal generic access network indication to a packet data protocol context activation to notify a gateway support node that path management is to be skipped at least for the entire PDP context activation session when the general packet radio service tunneling protocol endpoint has re-located under a universal generic access network or the universal generic access network access information is unavailable in the packet data protocol context activation phase.

13. The apparatus as recited in claim 1, wherein the apparatus comprises a serving general packet radio service support node.

14. An apparatus, comprising:
 means for identifying a mobile station (MS) as a general packet radio service (GPRS) tunneling protocol endpoint;
 means for causing transmitting of a radio access bearer to a universal generic access network controller to prevent activation of a path management procedure to the MS general packet radio service tunneling protocol endpoint; and
 means for causing transmission of a packet data protocol (PDP) context activation to a gateway GPRS support node (GGSN), the PDP context activation including a universal generic access network indication to notify the GGSN to prevent activation of the path management procedure to the MS general packet radio service tunneling protocol endpoint, wherein the activation of the path management procedure is prevented for an entire PDP context activation session;
 wherein the path management procedure comprises one of echo request messages, echo response messages, and version not supported messages.

15. A system, comprising:
 a mobile station (MS) endpoint, wherein the endpoint is a general packet radio service (GPRS) tunneling protocol;
 a universal generic access network controller; and a serving node comprising at least one processor and at least one memory including a computer program, the at least one memory and the computer program configured to, with the at least one processor, direct the serving node at least to identify the MS endpoint as a general packet radio service tunneling protocol endpoint, cause transmission of a radio access bearer to the universal generic access network controller to prevent activation of a path management procedure to the MS general packet radio service tunneling protocol endpoint, and cause transmission of a packet data protocol (PDP) context activation to a gateway GPRS support node (GGSN), the PDP context activation including a universal generic access network indication to notify the GGSN to prevent activation of the path management procedure to the MS general packet radio service tunneling protocol endpoint, wherein the activation of the path management procedure is prevented for an entire PDP context activation session;
 wherein the path management procedure comprises one of echo request messages, echo response messages, and version not supported messages.

16. The system as recited in claim 15, wherein the serving node is directed to determine, from the radio access bearer, a general packet radio service tunneling protocol endpoint address to identify the MS general packet radio service tunneling protocol endpoint.

17. A method, comprising:
 identifying a mobile station (MS) as a general packet radio service tunneling protocol endpoint;
 causing transmission of a radio access bearer to a universal generic access network controller to prevent activation of a path management procedure to the MS general packet radio service tunneling protocol endpoint; and
 causing transmission of a packet data protocol (PDP) context activation to a gateway GPRS support node (GGSN), the PDP context activation including a universal generic access network indication to notify the GGSN to prevent activation of the path management procedure to the MS general packet radio service tunneling protocol endpoint, wherein the activation of the path management procedure is prevented for an entire PDP context activation session;

wherein the path management procedure comprises one of echo request messages, echo response messages, and version not supported messages.

18. The method as recited in claim 17 wherein the general packet radio service tunneling protocol (GTP-U) endpoint is configured to support an Iu Interface Generic Access (Iu mode GAN).

19. The method as recited in claim 17, further comprising: performing the identifying of the general packet radio service tunneling protocol endpoint through the universal generic access network controller to prevent activation of the path management procedure for the general packet radio service tunneling protocol endpoint.

20. The method as recited in claim 17, further comprising: causing transmission of radio access bearer assignments to the universal generic access network controller providing the general packet radio service tunneling endpoint.

21. The method as recited in claim 20, further comprising: identifying the universal generic access network controller when a radio network controller is added.

22. The method as recited in claim 20, further comprising: configuring the universal generic access network controller to identify itself in a reset phase or by sending a new message or utilizing an existing message.

23. The method as recited in claim 20, wherein the identifying of the universal generic access network controller comprises:
identifying the general packet radio service tunneling protocol endpoint based on a radio network controller identifier or routing area identification/location area identity.

24. The method as recited in claim 17, wherein the identifying comprises:
configuring internet protocol endpoints or ranges as general packet radio service tunneling protocol endpoints.

25. The method as recited in claim 17, wherein the path management procedure comprises a general packet radio service tunneling protocol path management.

26. The method as recited in claim 17, further comprising: setting an internet protocol address of the universal generic access network controller to an internet protocol address of a core network; and
setting a tunnel endpoint identifier of the universal generic access network controller to a tunnel endpoint identifier assigned to the core network to receive general packet radio service tunneling protocol messages directly from the MS general packet radio service tunneling protocol endpoint.

27. The method as recited in claim 17, further comprising: setting an internet protocol address of a radio access network to an internet protocol address of the endpoint using a universal generic access network controller; and
setting a tunnel endpoint identifier of the radio access network to a tunnel endpoint identifier assigned to the endpoint by the universal generic access network controller to send general packet radio service tunneling protocol messages directly to the MS general packet radio service tunneling protocol endpoint.

28. The method as recited in claim 17, wherein after identifying the endpoint as a general packet radio service tunneling protocol endpoint, further comprising:
configuring a radio access bearer as a universal generic access network controller radio access bearer to skip the path management procedure at least for the entire PDP context activation session.

29. The method as recited in claim 17, further comprising: causing an updated universal generic access network indication to be provided to a packet data protocol context activation to notify a gateway support node that path management is to be skipped at least for the entire PDP context activation session when the general packet radio service tunneling protocol endpoint has re-located under a universal generic access network or the universal generic access network access information is unavailable in the packet data protocol context activation phase.

30. The method as recited in claim 17, further comprising: selectively configuring specific general packet radio service tunneling protocol endpoints to skip the path management at least for the entire PDP context activation session.

31. The method as recited in claim 17, further comprising: causing hiding of the general packet radio service tunneling protocol endpoint behind a universal generic access network to answer echo requests sent by a core network.

32. The method as recited in claim 17, further comprising: disabling echo request/response and version unsupported messages for the general packet radio service tunneling protocol endpoint.

33. A non-transitory computer readable medium embodied with a computer program, the computer program being configured to control a processor to perform:
identifying a mobile station (MS) as a general packet radio service (GPRS) tunneling protocol endpoint;
causing transmission of a radio access bearer to a universal generic access network controller to prevent activation of a path management procedure to the MS general packet radio service tunneling protocol endpoint; and
causing transmission of a packet data protocol (PDP) context activation to a gateway GPRS support node (GGSN), the PDP context activation including a universal generic access network indication to notify the GGSN to prevent activation of the path management procedure to the MS general packet radio service tunneling protocol endpoint, wherein the activation of the path management procedure is prevented for an entire PDP context activation session;
wherein the path management procedure comprises one of echo request messages, echo response messages, and version not supported messages.

* * * * *